H. PARKHURST.
Horse-Power.

No. 164,588.

Patented June 15, 1875.

ATTEST,
John H. Redstone
S. Geo. Holbrook

INVENTOR.
Horace Parkhurst

UNITED STATES PATENT OFFICE.

HORACE PARKHURST, OF OAKLAND, CALIFORNIA.

IMPROVEMENT IN HORSE-POWERS.

Specification forming part of Letters Patent No. 164,588, dated June 15, 1875; application filed May 18, 1875.

*To all whom it may concern:*

Be it known that I, HORACE PARKHURST, of Oakland, in the county of Alameda and State of California, have invented certain new and useful Improvements in Horse-Powers, of which the following is a specification, reference being had to the accompanying drawing.

Figure 1:
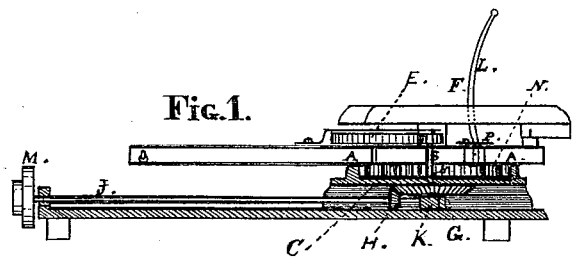
Figure 2:
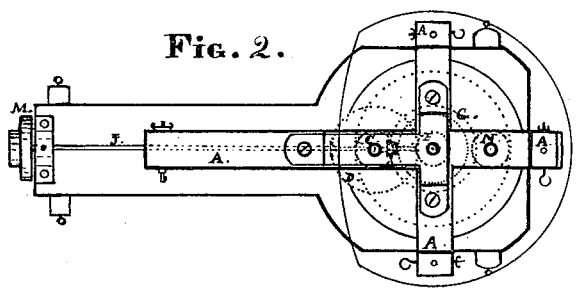
Figure 3:
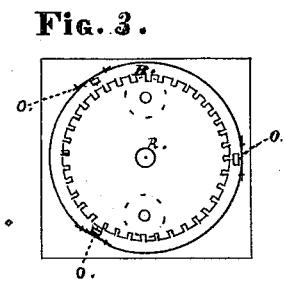
Figure 4:
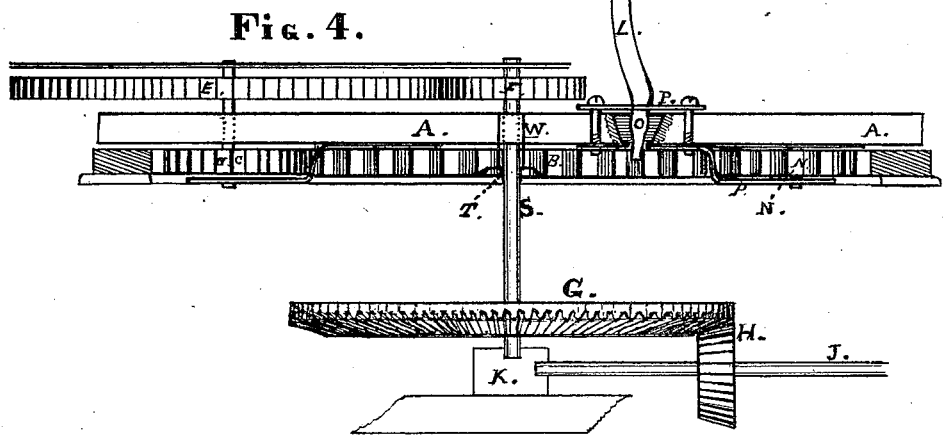

Figure 1 is a side elevation, partly in section. Fig. 2 is a plan view, the dotted lines showing the position of the gear. Fig. 3 is a plan view of the combined bed-plate and master-wheel; and Fig. 4 is an enlarged sectional elevation, showing the arrangement of the gearing and the brake designed for stopping the machine.

A represents the lever-frame, to which the horses are attached. B represents the combined bed-plate and master-wheel. C represents the main driving-pinion, which gears with the master-wheel B for the purpose of giving motion to the spur-wheel E, which gears with the pinion F, and gives motion to the bevel-wheel G by means of the shaft S, thereby giving motion to the pinion H, which gives motion to the drum or belt-pulleys M. The lever L is to operate the friction-pinion N, which is attached to the sliding frame P. The block K holds the bearings of the shafts S and J.

The following is the operation of the same: The horses being attached to the lever-frame A in the usual way, as the same is revolved motion is given to the pinion C, which gives motion to the belt-wheel by means of the gear E, F, and G, as has been shown.

In case it is necessary to stop the machine in case of accident, or for other reasons rendering it necessary to stop the same quickly, the lever L is operated, sliding the frame P, and forcing the pinion N deeply in gear, until the deep meshing of the cogs lock or stop the machine by friction.

The advantages of this machine are seen in its compactness and durability, and in the readiness with which it may be stopped in case of accident, thereby lessening the danger common to thresher and other horse-powers having rapid motion.

To relieve the machine from friction I have employed the friction-rolls O, which are set in the bed-plate wheel B. The bed-plate wheel B is cast with a floor upon the lower face instead of arms; and the main bearing of the shaft S is in the center of the same at T, as shown in Fig. 4. The lever-frame A is fulcrumed on the shaft S over the sleeve W, which is connected with, and forms part of, the bed-plate wheel B, and forms a firm pivot for the lever-frame to which the horses are attached. The lever-frame also has its bearings upon the friction-rolls O. (Shown in Fig. 3.) The friction and lock pinion N has its bearings in the sliding frame P, which is operated by the lever L. The teeth are wedging; and the necessary friction may be applied to stop the machine almost instantly by means of the lever L.

Having thus described my invention, what I claim, and desire to secure by Letters Patent, is—

The lever-frame A, the combined bed-plate and master-wheel B, the pinion C, the spur-wheel E, the pinion F, the shaft S, the bevel-wheel G, the pinion H, the shaft J, the sliding frame P, attached to the lever-frame A, and having the pinion N operated by the lever L, the whole being combined and operated as set forth.

HORACE PARKHURST.

Attest:
JOHN H. REDSTONE,
S. GEO. HOLBROOK.